United States Patent
Thomsen

(10) Patent No.: US 8,564,963 B2
(45) Date of Patent: Oct. 22, 2013

(54) AUTOMATED MECHANICAL DISCONNECTION OF AN ELECTRICAL CONVERTER MODULE IN A FREQUENCY CONVERTER ARRANGEMENT

(75) Inventor: Thyge Skovbjerg Thomsen, Herning (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/478,232

(22) Filed: May 23, 2012

(65) Prior Publication Data
US 2012/0230077 A1    Sep. 13, 2012

Related U.S. Application Data

(62) Division of application No. 13/090,317, filed on Apr. 20, 2011, now Pat. No. 8,223,499.

(30) Foreign Application Priority Data

May 12, 2010 (EP) .................................... 10162639

(51) Int. Cl.
*H05K 7/00* (2006.01)

(52) U.S. Cl.
USPC ........................... 361/728; 361/727; 361/756

(58) Field of Classification Search
USPC .................... 361/679.01, 681, 682, 684, 689, 361/727–730, 749, 759–761, 801–803; 363/13, 65, 67, 69, 70, 74, 78, 84, 90; 307/43, 44, 48, 52, 53
See application file for complete search history.

(56) References Cited

U.S. PATENT DOCUMENTS

| | | | | |
|---|---|---|---|---|
| 4,615,410 A | * | 10/1986 | Hosaka | 180/197 |
| 4,662,492 A | * | 5/1987 | Troeder | 477/177 |
| 7,130,190 B1 | * | 10/2006 | Baker | 361/695 |
| 7,800,914 B2 | * | 9/2010 | Dully | 361/756 |
| 7,940,529 B2 | * | 5/2011 | Merrow et al. | 361/728 |
| 8,179,696 B2 | * | 5/2012 | Coomer et al. | 361/819 |

* cited by examiner

*Primary Examiner* — Hung S Bui

(57) ABSTRACT

An arrangement is described for receiving an electrical converter module for converting a first frequency of an electrical input signal into a second frequency of an electrical output signal. A rack includes input terminals for receiving the electrical input signal and output terminals for providing the electrical output signal. A slot receives the converter module in a first and second positions where in first position the converter module is electrically connected both to the input and output terminals and in the second position the converter module is electrically disconnected both from the input and output terminals. An actuator, which is mounted to the rack and which, in response to a disconnect trigger signal, is adapted to move the electrical converter module from the first position to the second position. A frequency converter system equipped with such an arrangement and a method for disconnecting a converter module are provided.

2 Claims, 2 Drawing Sheets

AUTOMATED MECHANICAL DISCONNECTION OF AN ELECTRICAL CONVERTER MODULE IN A FREQUENCY CONVERTER ARRANGEMENT

CROSS REFERENCE TO RELATED APPLICATIONS

This application is a divisional of U.S. Ser. No. 13/090,317 filed Apr. 20, 2011 now U.S. Pat. No. 8,223,499 and claims priority of European Patent Office application No. 10162639.8 EP filed May 12, 2010. All of the applications are incorporated by reference herein in their entirety.

FIELD OF INVENTION

The present invention relates to the field of electric power generation. In particular, the present invention relates to an arrangement for receiving an electrical converter module, which is adapted for converting a first frequency of an electrical input signal into a second frequency of an electrical output signal. Further, the present invention relates to a frequency converter system, which is equipped with such an arrangement. Furthermore, the present invention relates to a method for disconnecting an electrical converter module, which is used for converting a first frequency of an electrical input signal into a second frequency of an electrical output signal.

ART BACKGROUND

In order to feed electrical energy from a power generating machine, e.g. a wind turbine, to an electricity network, it is typically necessary to adapt the frequency of the generated electrical power to an operating frequency of the electricity network.

For wind turbines there are known frequency converter arrangements, which use a number of identical inverter modules and/or converter modules in parallel in order to reach a desired capacity of electrical power. In the following these modules are referred to as electrical converter modules.

In case of a defect of one of the electrical converter modules the power generating machine must be stopped and the respective frequency converter must be disconnected from the electricity network until the defect electrical converter module has been exchanged. This is due to the fact that a failure within an electrical converter module is often caused by a short circuit in an Insulated Gate Bipolar Transistor (IGBT), which is a controlled power semiconductor. Therefore, the respective defect electrical converter module cannot only be disconnected logically but must be physically disconnected in order to allow the remaining electrical converter modules to continue their operation.

In many frequency converters being used for power generation machines, in particular for wind turbines, the electrical converter modules are placed like large books side by side on a shelf, bolted to the chassis and are equipped with bolted AC and DC main current connections. In case of a failure of already one of the electrical converter modules a removal of the respective module is a cumbersome procedure, which, as has already been described above, requires the power generation machine to stop its operation. Thereby, the downtime of the power generation machine is increased.

There may be a need for facilitating the disconnection of an electrical converter module within a frequency converter.

SUMMARY OF THE INVENTION

This need may be met by the subject matter according to the independent claims. Advantageous embodiments of the present invention are described by the dependent claims.

According to a first aspect of the invention there is provided an arrangement for receiving an electrical converter module for converting a first frequency of an electrical input signal into a second frequency of an electrical output signal. The provided arrangement comprises (a) a rack comprising (a1) input terminals for receiving the electrical input signal from a power generation machine and (a2) output terminals for providing the electrical output signal to an electricity network, (b) a slot for receiving the electrical converter module in a first position and in a second position, wherein in the first position the electrical converter module is electrically connected both to the input terminals and to the output terminals and wherein in the second position the electrical converter module is electrically disconnected both from the input terminals and from the output terminals, and (c) an actuator, which is mounted to the rack and which, in response to a disconnect trigger signal, is adapted to move the electrical converter module from the first position to the second position.

The described arrangement is based on the idea that the disconnection of a defect electrical converter module can be realized automatically by means of a remote controllable trigger signal. This automatic disconnection can be realized within a short time period. After the automatic disconnection a frequency converter system, which comprises the described arrangement, can be temporarily mended for instance within a few minutes such that the power generating machine can be put in an almost normal operation again, wherein only a slightly reduced power generation can be performed. As a consequence, a high availability of power production, however at a limited load, can be achieved. This may especially be advantageous at off-shore wind turbines, wherein, due to weather dependent access to repair, the availability gain can significantly improve the effective performance of the wind turbine with respect to the amount of power production.

All terminals and in particular the main current connections may be pluggable. Preferably, a disconnection between the converter module and the rack is done at a point in time at which there is a no-load situation period. This may provide the advantage that the main current plug connections do not have to be designed for current breaking. This allows to realize the connections with comparable simple structures and to reduce the costs for the described arrangement.

The number of input terminals may depend on the type of electrical power which is generated by the power generating machine. Typically, in particular when the power generating machine is a wind turbine, the frequency converter arrangement comprises three input terminals which allow for receiving a three-phase alternating current from the generator of the wind turbine.

The number of output terminals depends on the type of electrical power which is fed to the electricity net. Typically, the electrical output power is provided also as a three-phase current such that the number of output terminals is also three.

It is mentioned that it is also possible that the second frequency is zero. This means that the electrical output power is provided as a direct current (DC). In this case the number of output terminals may be also two.

It is noted that the above elucidation with respect to the number of input and output terminals refers to a single electrical converter module only. It should be understandable for a person skilled in the art that of course the total number of input respectively output terminals might be direct proportional to the number of slots, which each might be used for receiving an electrical converter module.

According to an embodiment of the invention the actuator comprises an electromechanical transducer. The electromechanical transducer may be realized for instance by means of an electric motor, which is connected with a spindle gear. Thereby, a smooth linear movement of the electrical converter module from the first position to the second position can be achieved.

If one considers that typically the speed of movement from the connected position (i.e. the first position) to the disconnected position (i.e. the second position) is not critical, in particular in a so called no-load situation of the converter module, a gentle movement caused by the described electromechanical transducer may ensure that unnecessary mechanical shocks acting on the converter module can be effectively prevented.

According to a further embodiment of the invention the actuator comprises a spring loaded system. The spring loaded system could retract the converter module from the first position, at which the converter module is securely engaged with the rack, to the second position, at which the converter module is disengaged from the rack. The spring loaded system may be released or activated by means of a solenoid activated trigger mechanism and/or by means of a mechanism driven by an electrical motor.

The use of a spring loaded system and/or the use of a pyro-technical solution for the actuator may provide the advantage that a rapid disconnection of the converter module can be realized. This would allow to disconnect the converter module from the rack terminals also in a so called load situation, wherein the converter module is active and a current is flowing across the plug connections being defined by the converter module terminals and the respective rack terminals.

According to a further embodiment of the invention the arrangement further comprises a controller for controlling the operation of the actuator.

In case of a failure of the converter module the controller might receive an according signal e.g. from the electrical converter module and/or from an electrical monitoring device, which is monitoring the operational states of the converter module.

According to a further embodiment of the invention the slot comprises at least one rail and a locking mechanism for locking the converter module in the first position and/or in the second position. This may mean that the guiding rails shall include a locking mechanism to lock the converter module in either the engaged position, where the main current connection plugs are mated, or in disengaged position, where the main current plug connections are disconnected.

It is mentioned that in the disengaged position an air gap between mating parts for each potential should be sufficiently large in order to provide an electrical isolation. For realizing a sufficient air gap dimension of course the voltage difference between the disconnected plug components should be taken into account.

According to a further embodiment of the invention the rack comprises (a) further input terminals for receiving a further electrical input signal from the power generation machine and (b) further output terminals for providing a further electrical output signal to the electricity network. Further, the described arrangement further comprises (a) at least one further slot for receiving a further electrical converter module in a first position and in a second position, wherein in the first position the further electrical converter module is electrically connected both to the further input terminals and to the further output terminals and in the second position the further electrical converter module is electrically disconnected both from the further input terminals and from the further output terminals, and (b) a further actuator, which is mounted to the rack and which, in response to a disconnect trigger signal, is adapted to move the further electrical converter module from the first position to the second position.

This multi slot arrangement may provide the advantage that it can be used for a large frequency converter system, which comprises at least two and preferably a plurality of electrical converter modules and which is adapted to convert the frequency of high power input signals, which may be provided by a power generation machine such as for instance a wind turbine and/or a plurality of wind turbines.

Generally speaking, an actuator placed in each rack slot and controlled by the above described controller shall disconnect the defect electrical converter module by moving it from the first (engaged) position to the second (disengaged) position. As has already been described above, after having set the defective electrical converter module in the second position, the frequency converter system, which comprises still at least one faultless electrical converter module, can be put into normal operation. Thereby, the normal operation is characterized by a reduced load.

According to a further aspect of the invention there is provided a frequency converter system for converting a first frequency of an electrical input signal into a second frequency of an electrical output signal. The provided frequency converter system comprises (a) an arrangement as described above for receiving an electrical converter module and (b) an electrical converter module for converting the first frequency of the electrical input signal into the second frequency of the electrical output signal. The electrical converter module is receivable by the slot.

Also the described frequency converter system is based on the idea that in case of a defect of the electrical converter module the respective module can be automatically put into the second (disengaged) position. Thereby, the above described actuator is used, which in case of a defect receives the described disconnect trigger signal.

According to an embodiment of the invention the electrical converter module is an electrical switching module. In this document the term electrical switching module may refer to a converter module, which first converts an alternating current with the first frequency to a DC current and which second converts the DC current to an alternating current with the second frequency.

According to a further embodiment of the invention, the electrical converter module is an electrical inverter module. In this document the term electrical inverter module may refer to a converter module, which either converts an AC current to a DC current or a DC current to an AC current.

In this respect it is mentioned that of course a sole inverter module is not able to perform a frequency conversion from the first frequency to the second frequency under the assumption that both frequencies are unequal to zero. However, a single inverter module may at least contribute in performing an AC-AC frequency conversion, which is described above in accordance with the first aspect of the invention.

It is mentioned that a frequency converter system, which can be used for connecting a wind turbine to an electricity network, may comprise several AC-DC inverter modules, which are connected to a DC busbar. Specifically, (a) a number of AC-DC inverter modules can be connected between an energy producing generator and the DC busbar and (b) a number of AC-DC inverter modules can be connected between an electricity network and the DC busbar.

Further, a frequency converter system for a wind turbine can comprise two inverter panels each comprising at least one inverter module. One inverter panel, which may be placed in the bottom of the wind turbine, can be connected with its AC-side to the electrical network. Another inverter panel, which may be placed in the nacelle of the wind turbine, can be connected with its AC-side to the generator of the wind turbine. The DC-sides of both inverter panels can be connected with each other through cables running in the tower the wind turbine. Thereby, these cables are electrically assigned to the above mentioned busbar.

According to an embodiment of the invention the electrical converter module comprises a monitoring unit for monitoring the operation of the electrical converter module. Thereby, the monitoring unit is adapted for generating the disconnect trigger signal and/or for generating a precursor signal of the disconnect trigger signal, if there occurs a defect in the electrical converter module.

In case the frequency converter comprises a plurality of electrical converter modules each converter module may have a monitoring unit for realizing a diagnostic function in order to identify defects of the respective electrical converter module and in order to report a defect to the above described controller, which can be seen as the main controller of the described frequency converter system.

According to a further aspect of the invention there is provided a method for disconnecting an electrical converter module, which is used for converting a first frequency of an electrical input signal into a second frequency of an electrical output signal, within a rack, which comprises input terminals for receiving the electrical input signal from a power generation machine and output terminals for providing the electrical output signal to an electricity network. The provided method comprises (a) receiving a disconnect trigger signal, which is indicative for an error status of the electrical converter module, and (b) in response to the disconnect trigger signal, moving the electrical converter module within a slot of the rack from a first position to a second position by means of an actuator being mounted to the rack. In the first position the electrical converter module is electrically connected both to the input terminals and to the output terminals and in the second position the electrical converter module is electrically disconnected both from the input terminals and from the output terminals.

Also the described method is based on the idea that, if a defect of the electrical converter module occurs, the electrical converter module can automatically be put into the second (disengaged) position. The automatic disconnection can be realized quickly, effectively and easily. After the automatic disconnection a frequency converter system, which comprises the above described arrangement for receiving the electrical converter module, can be temporarily mended such that the power generating machine can be put in an almost normal operation again. Thereby, only a slightly reduced power generation can be performed. As a consequence, a high availability of power production, however at a limited load, can be achieved.

According to an embodiment of the invention moving the electrical converter module from the first position to the second position is carried out during a no-load situation.

In this respect it is mentioned that a no-load situation exists if there is no current flowing (a) from the terminals being assigned to the AC portion of the converter module to (b) the terminals being assigned to the DC portion of the converter module. Therefore, in a no-load situation the converter module can be moved to the second position without the risk of an arcing when opening the connections of the terminals.

In the following it is explained how a no-load situation may occur: A failure in an electrical converter module is typically a breakdown within one Insulated Gate Bipolar Transistor (IGBT) or in more IGBT's causing a short circuit between the AC portion and the DC portion of the converter module. This short circuit is typically detected by a frequency converter control system, which causes all other converter modules to switch off immediately in order to avoid feeding energy into the short circuit which could cause explosion and fire in the converter system. This means that the wind turbine is immediately taken out of operation. The operational stop of the wind turbine will last until the converter module is repaired. In the following a circuit breaker mechanism between the converter module respectively a converter comprising the converter module is opened. In case a generator with permanent magnets is employed, also a circuit breaker mechanism or disconnecting mechanism between the frequency converter system and the generator is activated. As a result, the converter module respectively the whole frequency converter system is left de-energized and no current flows through the (frequency) converter (system). At this point a no-load situation exists.

Disconnecting the electrical converter module in a no-load situation may provide the advantage that the main current plug connections do not have to be designed for current breaking. This makes the electric and/or the mechanical design of the converter module and/or of the above described arrangement for receiving the electrical converter module much easier.

It has to be noted that embodiments of the invention have been described with reference to different subject matters. In particular, some embodiments have been described with reference to apparatus type claims whereas other embodiments have been described with reference to method type claims.

However, a person skilled in the art will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the example of embodiment to be described hereinafter and are explained with reference to the example of embodiment. The invention will be described in more detail hereinafter with reference to an example of embodiment but to which the invention is not limited.

DETAILED DESCRIPTION

Figure 1A:
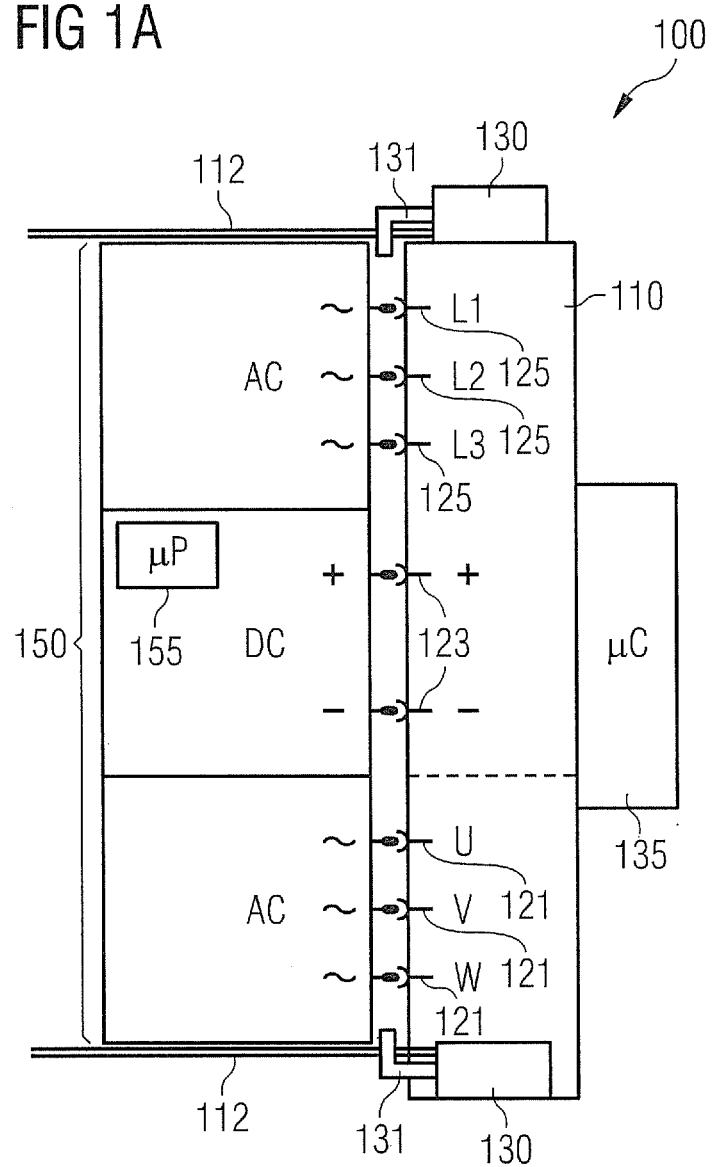
FIG. 1a shows a frequency converter system in accordance with an embodiment of the invention, wherein the electrical converter module is in the connected position.

The illustration in the drawing is schematically. It is noted that in different figures, similar or identical elements are provided with the same reference signs.

FIG. 1a shows a frequency converter system 100 in accordance with an embodiment of the invention. In the situation shown in FIG. 1a, the electrical converter module 150 is in the connected position.

The frequency converter system 100 comprises a rack 110 with a plurality of slots. In the schematic cross sectional view of FIG. 1a only one slot can be seen. The other slots may be located above or below the selected plane of projection. Of course, the rack may also comprise further slots, which are placed sideways with respect to the slot depicted in FIG. 1a.

Each slot of the rack 110 comprises a pair of rails 112. The rails 112 facilitate an insertion of the electrical converter module 150 into the slot.

The rack 110 further comprises three input terminals 121 for receiving an electrical input signal from a non depicted power generation machine. According to the embodiment described here the power generation machine is a wind turbine or an entirety of several wind turbines, which are electrically connected with each other. The wind turbine(s) generate(s) a three-phase alternating current. In FIG. 1a the three phases are denominated "U", "V" and "W".

According to the embodiment described here the electrical converter module 150 comprises an AC/DC/AC converter. Therefore, the converter module 150 is also denominated a switching module 150. An electrical three-phase alternating current input signal, which is fed into the three input terminals 121, is firstly converted into a DC signal and is secondly converted into an electrical three-phase alternating current output signal having a frequency, which is typically different from the frequency of the input signal.

At this point it is mentioned that in a wind turbine comprising an asynchronous generator, there is a reactive electric power flowing from the electrical network or provided by capacitors in the DC-link of the converter system in order to provide the necessary magnetization of the generator. By contrast thereto, active power normally flows from the generator to the electrical network.

The output signal is provided at three output terminals 125, which in FIG. 1a are denominated "L1", "L2" and "L3". If one wants to grip DC power and/or for measurement and/or for diagnostic purposes, the electrical switching module 150 further comprises two intermediate terminals 123. The intermediate terminals 123 are assigned to the DC stage of the AC/DC/AC converter.

As can be seen from FIG. 1a the electrical converter module 150 comprises a monitoring unit 155. According to the embodiment described here the monitoring unit 155 comprises a microprocessor, which monitors in a non depicted but known manner the operation respectively the operational state of the electrical converter module 150. If the monitoring unit 155 detects a failure of the electrical converter module 150, an according failure signal is generated. The failure signal is provided to a main controller of the rack 110.

The main controller 135, which is mounted to the rack 110, determines the slot of the electrical converter module 150, which has generated the failure signal. In response thereto, the main controller 135 transmits a "disconnect trigger signal" to two actuators 130, which are mounted at the side of the respective slot. In response to this "disconnect trigger signal" the actuators 130 become active. Thereby, an engagement arm 131 is moved outwards, which laterally moves outwards the electrical converter module 150 with respect to the rack 110 and which thereby disconnects the electrical converter module 150 from the terminals 121, 123 and 125. The disconnected position of the electrical converter module 150 is shown in FIG. 1b.

Figure 1B:
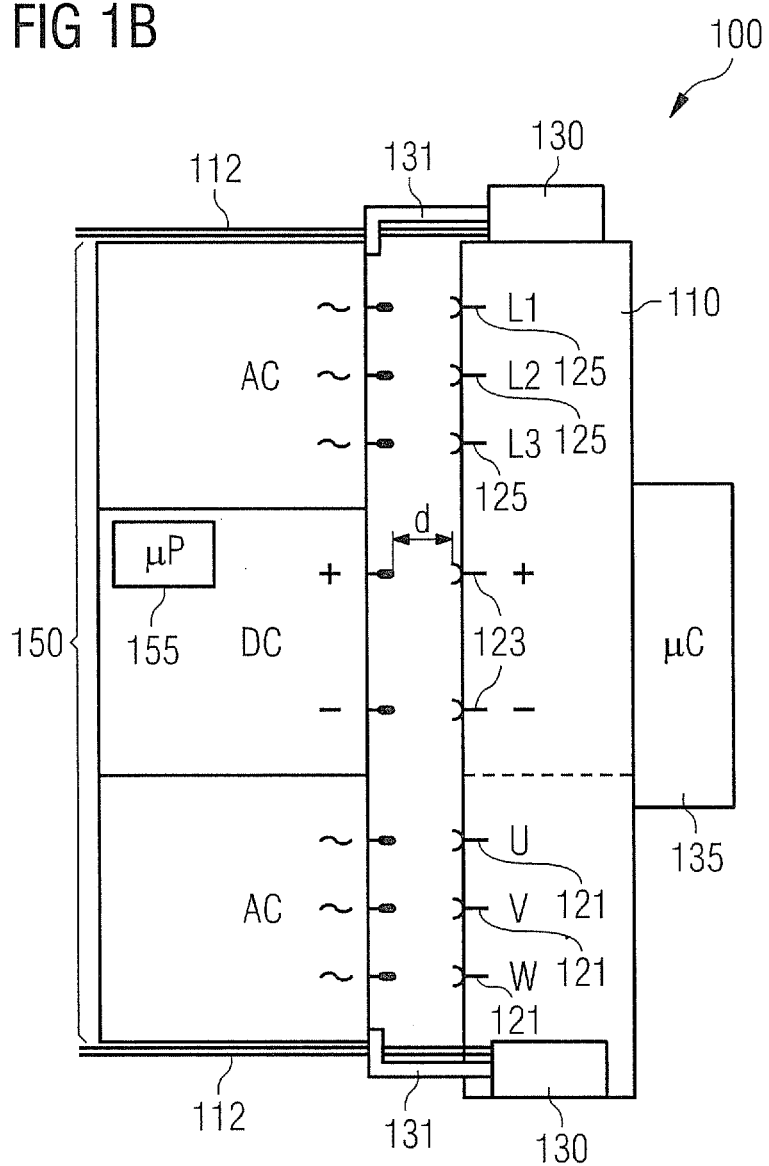
FIG. 1b shows the frequency converter system illustrated in FIG. 1a, wherein the electrical converter module is in the disconnected position.

As can be seen from FIG. 1b, in the disconnected position the terminals 121, 123 and 125 are separated from the corresponding terminals of the electrical converter module 150 by a distance d. This distance d is selected such that a reliable air isolation is provided between each of the respective opposing terminals. Of course, when designing the frequency converter system 100 the distance d should be selected depending on the voltage differences between each of the terminals 121, 123 and 125 and the respective opposing terminal of the electrical converter module 150.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A method for disconnecting an electrical converter module, which is used for converting a first frequency of an electrical input signal into a second frequency of an electrical output signal, within a rack, which comprises input terminals for receiving the electrical input signal from a power generation machine and output terminals for providing the electrical output signal to an electricity network, the method comprising:

receiving a disconnect trigger signal, which is indicative for an error status of the electrical converter module; and in response to the disconnect trigger signal, moving the electrical converter module within a slot of the rack from a first position to a second position by an actuator being mounted to the rack, wherein in the first position the electrical converter module is electrically connected both to the input terminals and to the output terminals and in the second position the electrical converter module is electrically disconnected both from the input terminals and from the output terminals.

2. The method as set forth in the claim 1, wherein moving the electrical converter module from the first position to the second position is carried out during a no-load situation.

* * * * *